US008029868B1

(12) United States Patent
Gerace

(10) Patent No.: US 8,029,868 B1
(45) Date of Patent: Oct. 4, 2011

(54) METHOD OF FORMING COMPOSITE ROOFING OVERLAY CONTAINING PAINT WASTE

(75) Inventor: Michael J. Gerace, North Charleston, SC (US)

(73) Assignee: Polymer Recycling, LLC, North Charleston, SC (US)

( * ) Notice: Subject to any disclaimer, the term of this patent is extended or adjusted under 35 U.S.C. 154(b) by 1080 days.

(21) Appl. No.: 11/753,605

(22) Filed: May 25, 2007

Related U.S. Application Data

(60) Provisional application No. 60/808,894, filed on May 26, 2006.

(51) Int. Cl.
 *B05D 7/00* (2006.01)
 *B05D 1/36* (2006.01)
 *C08J 11/00* (2006.01)

(52) U.S. Cl. ............ 427/403; 427/412; 427/412.1

(58) Field of Classification Search .......... 427/403, 427/412, 412.1, 408; 252/312, 330; 95/189, 95/190; 507/110; 428/402, 403, 406; 524/268, 524/204, 205, 280, 457, 501, 565, 567; 521/41
See application file for complete search history.

(56) References Cited

U.S. PATENT DOCUMENTS

| | | | |
|---|---|---|---|
| 4,241,107 A * | 12/1980 | Mandish et al. | 427/140 |
| 4,874,432 A * | 10/1989 | Kriech et al. | 106/273.1 |
| 4,980,030 A * | 12/1990 | Johnson et al. | 203/4 |
| 5,254,256 A | 10/1993 | Zuerner et al. | |
| 5,376,238 A | 12/1994 | Zambory | |
| 5,880,218 A * | 3/1999 | Gerace et al. | 525/239 |
| 5,916,392 A * | 6/1999 | Ghanbari | 156/71 |
| 5,922,834 A | 7/1999 | Gerace et al. | |
| 6,218,012 B1 | 4/2001 | Rota et al. | |
| 6,455,598 B1 * | 9/2002 | Gerace et al. | 521/41 |
| 7,128,780 B2 * | 10/2006 | Matheson et al. | 106/697 |
| 2003/0236173 A1 | 12/2003 | Dobson, Jr. et al. | |

FOREIGN PATENT DOCUMENTS

WO WO 99/03920 A1 * 1/1999

OTHER PUBLICATIONS

Stanley Roofing Co., Eterna-Seal System. (2009) Available Online at: http://www.stanleyroofing.com/html/eterna-seal_system.htm.
Truco, Inc. Eterna-Seal SEBS Rubber Coating 7145. (2009) Available Online at: http://www.truco-inc.com/data/7145.pdf.
Dow Surfactants—Nonylphenol ethoxylates. (1995) Available Online at: http://www.dow.com/surfactants/products/nonylph.htm.
Chemindustry.com, Santicizer160 Chemical Info. (1999) Available Online at: http://www.chemindustry.com/chemicals/524008.html.
Stanley Roofing Co., Eterna-Seal System (2009) Available Online at http://222.stanleyroofing.com/html/eterna-seal_system.htm.
Advisory Action pertaining to U.S. Appl. No. 12/207,610 dated Mar. 10, 2010.
Office Action pertaining to U.S. Appl. No. 12/207,610 dated Jun. 12, 2009.
Final Rejection pertaining to U.S. Appl. No. 12/207,610 dated Dec. 29, 2009.

* cited by examiner

*Primary Examiner* — William Phillip Fletcher, III
(74) *Attorney, Agent, or Firm* — Dinsmore & Shohl LLP

(57) ABSTRACT

A method of forming a composite roofing overlay is provided which includes applying a bedding cement to a roofing surface, embedding a porous fabric in the bedding cement, followed by application of a primer and an elastomeric sealer. The bedding cement includes water-based paint waste and sand.

5 Claims, 1 Drawing Sheet

METHOD OF FORMING COMPOSITE ROOFING OVERLAY CONTAINING PAINT WASTE

CROSS-REFERENCE TO RELATED APPLICATIONS

This application claims the benefit of U.S. Provisional Application No. 60/808,894, filed May 26, 2006, entitled ROOFING PRODUCTS CONTAINING PROCESSED PAINT WASTE. The entire contents of said application are hereby incorporated by reference.

BACKGROUND OF THE INVENTION

The present invention relates to roofing products containing processed paint waste, and more particularly, to products such as elastomeric sealers, primers, caulk, and bedding cement which contain treated paint waste obtained from oil-based and/or water-based paints.

Re-roofing an existing roof is an expensive operation, as such an operation typically includes tearing off the existing roof and replacing defective decking, sheathing, insulation, and the like. Typically, there is a period of time during the re-roofing process in which the inside structure is exposed to outside weather elements; rendering the inside structure vulnerable to water damage. In addition, such a re-roofing process ultimately does not significantly enhance the value of the structure.

In order to avoid the expense of removing and replacing an entire roof, an increasing emphasis has been placed on products for extending the life of existing roof structures. Such products include asphalt and coal tar cements, as well as caulking, aluminized asphalt, elastomeric sealers, patching tapes, and the like. However, such products are only a temporary solution to roof leaks and are often ineffective. In addition, many currently available sealant systems contain solvents, which result in undesirably high volatile organic content (VOC) levels. In addition, such systems may also contain cold tar derivatives, which are known to contain carcinogenic polynuclear aromatic compounds (PNAs).

Moreover, in new construction, a need is emerging for roofing systems containing recycled content. For example, the U.S. Green Building Council has promoted recycling efforts in construction through its "Leadership in Energy and Environment" or LEED program. In recent years, roofing products have been developed which utilize recycled automotive paint sludge as a polymeric component. See, for example, U.S. Pat. Nos. 6,455,598 and 5,880,218, the disclosures of which are incorporated herein by reference. However, while such products are environmentally friendly, the use of large amounts of paint sludge results in a wide variation in the roofing product composition as paint waste may be collected in a number of different ways and includes a mixture of several different components including primers, paints, and solvents. In addition, the paint sludge may include automotive solid waste materials such as metal parts, and the like.

Accordingly, there is a need in the art for a roofing system which will extend the life of an existing roof which is cost-effective, which is environmentally friendly, which provides effective sealing and adhesion characteristics, and is consistent in composition.

SUMMARY OF THE INVENTION

Embodiments of the present invention meet those needs by providing roofing products produced from oil-based and/or water-based paint wastes. The roofing products of the present invention provide an inexpensive and long-term solution to repairing roofs, and avoid tearing off the existing roof structure. In addition, the products are relatively inexpensive as they utilize paint waste materials which are readily available. While the sealer, primer, caulking and cement products described in the present invention are ideally suited to roof repair, it should be appreciated that they may also be used in new roof construction as well as in other sealing, priming, caulking, and cement applications.

According to one aspect of the present invention, a method of treating oil-based paint waste for use in roofing products is provided which comprises providing oil-based paint waste containing solvents, removing at least a portion of the solvents from the paint waste such that a paint waste residue is formed, and emulsifying the paint waste residue. The paint waste residue may be emulsified by the addition of one or more non-ionic surfactants.

According to another aspect of the present invention, an elastomeric sealer is provided which comprises paint waste residue formed from treated oil-based paint waste, water-based paint waste, at least one emulsifier, a virgin latex polymer, and a plasticizer. The elastomeric sealer may comprise from about 10 to about 40% by weight of the paint waste residue and from about 10% to about 30% by weight of the water-based paint.

The virgin latex polymer may comprise a styrenated acrylic polymer. The plasticizer may comprise butyl benzyl phthalate. The elastomeric sealer formulation has about 50% solids content.

In accordance with another aspect of the present invention, a primer for use in roofing applications is provided which comprises paint waste residue formed from treated oil-based paint waste, water-based paint waste, at least one emulsifier, and a plasticizer. The primer coating may comprise from about 10 to about 40% by weight of the paint waste residue and from about 40% to about 80% by weight of the water-based paint waste.

According to another embodiment of the present invention, an elastomeric caulk for use in roofing applications is provided which comprises paint waste residue formed from treated oil-based paint waste, water-based paint waste, a virgin latex polymer, at least one emulsifier, a plasticizer, and a thixotropic clay. The elastomeric caulk may comprise from about 10 to 40% by weight of the paint waste residue; and from about 10 to 30% by weight of the water-based paint waste.

According to another embodiment of the present invention, a bedding cement for use in roofing applications is provided which comprises from about 10 to about 50% by weight water-based paint waste and from about 40 to about 80% by weight sand. The bedding cement may further include from about 1 to about 10% by weight of a plasticizer. The plasticizer may comprise butyl benzyl phthalate.

The above roofing products of the present invention may be used to create a high-performance composite roofing overlay which bonds to a roof and effectively seals isolated areas or an entire roof surface. Such composite roofing overlays can be used as patches on an existing roof, or as new surfaces that can extend the life of the roof by 10 years or more.

In one method of forming a composite roofing overlay, the bedding cement is applied to a roofing surface, and a porous fabric is embedded in the bedding cement. The fabric may comprise a polyester cloth. A primer as described above is then applied over the porous fabric/bedding cement, followed by the optional application of the elastomeric caulk to smooth out any surface imperfections. A topcoat comprising the elastomeric sealer is then applied.

Accordingly, it is a feature of the present invention to provide a method of treating paint waste which can be used to form roofing products including an elastomeric sealer, a primer, caulking and bedding cement. It is further feature of the present invention to provide a method of forming a composite roofing overlay using these roofing products. These, and other features and advantages will become apparent from the following detailed description, the accompanying drawings, and the appended claims.

DETAILED DESCRIPTION OF THE PREFERRED EMBODIMENTS

Figure 1:
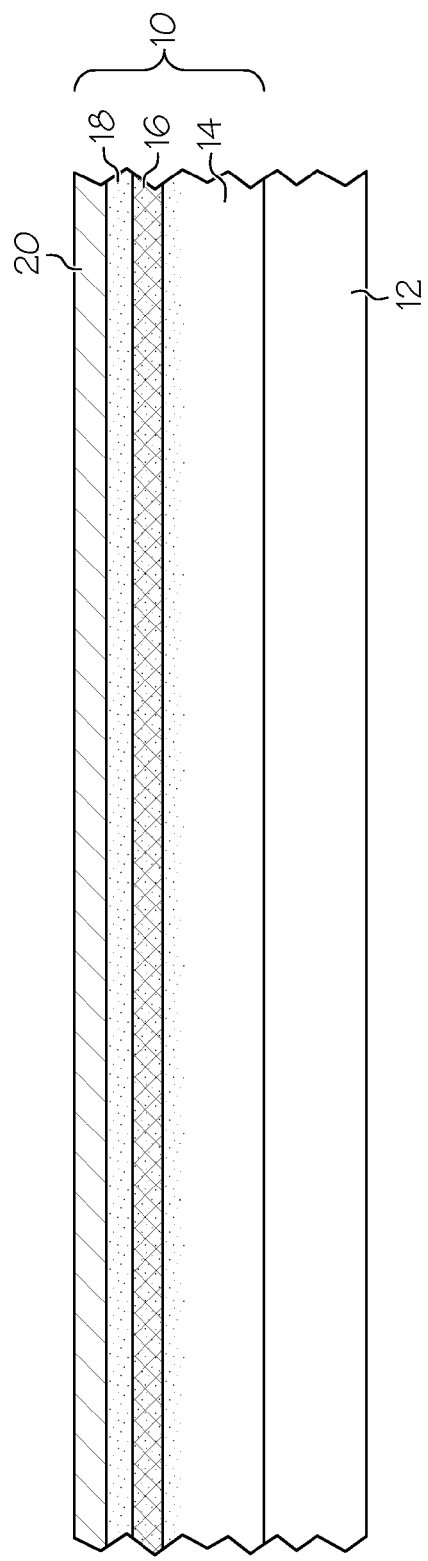
FIG. 1 is an illustration of a composite roofing overlay formed using the roofing products of the present invention.

The oil-based and water-based paint waste materials used to produce the roofing products of the present invention can be obtained from several sources including, but not limited to, automotive companies, industrial OEM equipment manufacturers, architectural painting contractors, household paint waste, paint manufacturers (who dispose of off-spec materials and waste products), paint distributors which have accumulated paint which is past its shelf life, paint contractors who accumulate paint residues left over from various paint jobs, and local land fills that accept paint waste from consumers. The roofing products of the present invention are inexpensive to produce and have a very low VOC content, i.e., about 10% or less. In the majority of roofing products produced, the VOC content is less than about 0.1 percent.

In the method of treating oil-based paint waste, at least a portion of the solvents contained in the paint are removed by agitating the paint waste under a vacuum at a temperature of about 225° F. such that a paint waste residue is formed. The paint waste residue is then emulsified by the addition of one or more surfactants. Suitable non-ionic surfactants used for emulsification include nonyl phenol ethoxylate and polyalkylene glycol monobutyl ether.

In embodiments where water-based paint waste (latex paint waste) is used to form a roofing product, the paint waste may be used in the form in which it is collected. However, the paint waste may be screened prior to use to ensure that it is free of particles or other foreign matter. The water-based paint waste has a viscosity of between about 1,000 to 3,000 cps and a solids content of about 40% to 70%.

After treatment, the paint waste materials may be used in a number of roofing products to create an impervious composite roofing overlay for a variety of roofs including single-ply membrane roofs, built-up roofs, metal roofs, and shingle roofs.

One example of an elastomeric sealer composition comprises paint waste residue formed from treated oil-based paint waste, water-based paint waste, at least one emulsifier, a virgin latex polymer, and a plasticizer. The elastomeric sealer preferably comprises about 24% by weight of the paint waste residue formed from treated oil-based paint waste, about 20% water-based paint, about 4% of an emulsifier, about 37% of a virgin latex polymer, and about 2% by weight plasticizer.

A suitable virgin latex polymer is a styrenated acrylic polymer, available from Union Carbide under the designation UCAR 123. The plasticizer may comprise butyl benzyl phthalate. The elastomeric sealer formulation has about 50% solids content.

The elastomeric sealer may be formed by providing the formed paint waste residue and then phase-inverting the paint waste residue by slowly adding surfactants and warm water prior to the addition of the water-based paint waste and other components.

It has been found that the addition of water-based paint waste improves the flow properties of the elastomeric sealer. In addition, it has been found that the addition of such paint waste allows air and water to more readily escape during solid film formation. As a result, the dried elastomeric sealer product shows substantially no bubbling or blistering defects after application.

One example of a primer composition for use in the present invention comprises about 24% by weight of the paint waste residue formed from oil-based paint waste, about 57% by weight of the water-based paint waste, about 4% of an emulsifier; and about 2% by weight of a plasticizer. Once applied to a surface and dried, the formed primer film is compatible with the elastomeric sealer which is typically used as a final topcoat on the roof surface.

An elastomeric caulk composition for use in the present invention comprises about 28% by weight of the paint waste residue; about 23% by weight of the water-based paint waste, about 43% by weight of the virgin latex polymer, about 4% by weight of an emulsifier(s); about 2% weight plasticizer, and about 2% of a thixotropic clay. The elastomeric caulk provides good elastomeric and adhesion properties, crack resistance, and very high elongation. The thixotropic nature of the caulk retards leveling such that the desired shape is maintained until a solid film is formed.

The bedding cement composition of the present invention may comprise about 33% by weight water-based paint waste and about 67% by weight sand. The bedding cement is non-elastic, crack-resistant, and forms a strong bond with the roof substrate and the elastomeric membrane which is formed over the bedding cement. Unlike traditional lime-based cements, the bedding cement of the present invention is in the form of a flowable, heavy liquid which does not require preparation or mixing prior to use.

The bedding cement may further include from about 1 to about 10% by weight of a plasticizer such as butyl benzyl phthalate. In this embodiment, the plasticizer functions as a thixotrope. The inclusion of a plasticizer may be used in applications where the bedding cement is used as a non-slump bedding cement, i.e., the cement does not level upon application. This bedding cement composition may be used in situations where a desired slope needs to be maintained, e.g., to maintain proper drainage.

The bedding cement, elastomeric sealer, primer, and elastomeric caulk products of the present invention may be used to form a composite roofing overlay on existing roof surfaces or new roof substrates. The surfaces of such roofs may be either gravel covered or smooth. In other instances, the top coat comprises asphalt, cold-tar, or modified bitumen.

For application of the roofing products of the present invention, the roofing surface should be as flat as possible, and where applicable, all loose gravel should be removed. Referring now to FIG. 1, a composite roofing overlay structure 10 formed on a roof surface or new roof substrate 12 using the roofing products of the present invention is shown. First, the bedding cement 14 is applied to the roof surface 12 which is preferably cleared of gravel and/or soil. The bedding cement may be applied in an amount of about 30 gallons per 100 square feet for a gravel-cleared, gravel covered built-up roof, and 20 gallons per square feet for either a smooth, built-up roof, a single-ply membrane, a shingle surface, or new roof substrate.

A layer of porous fabric 16 is then embedded in the wet bedding cement. A suitable porous fabric is a spun polyester cloth available under the designation Polylace. In instances where the roof is excessively recessed, the bedding cement/porous fabric combination can be applied in successive layers after each of the previously layers is sufficiently dry. The roofing fabric 16 may be applied in the form of a roll.

When the bedding cement/porous fabric combination is dry, a single coating of surface primer 18 (about 1 gallon per 100 square feet) is applied to the entire surface. It should be appreciated that because of the porous nature of the fabric, the primer 18 applied over the fabric not only saturates the fabric and forms a film over the fabric, but also penetrates into the bedding cement 14 forming a film below the fabric as well. When the surface primer is dry, the elastomeric caulk product (not shown) may optionally be applied to any areas where the roofing surface exhibits imperfections such as cracks, raised cloth edges, or other damage to smooth out the roofing surface. After application of the elastomeric caulk, a final topcoat of elastomeric sealer 20 should be applied to the entire roof surface.

The dry primer film/fabric/dry elastomeric sealer film forms a membrane and is bonded directly to the bedding cement which forms a leveling intermediate between the existing roof and the membrane. The combination of the bedding cement and membrane forms the composite overlay which forms the new roof cover.

In order that the invention may be more readily understood, reference is made to the following examples of compositions within the scope of the present invention, which examples are intended to be illustrative of the invention, but are not intended to be limiting in scope.

Example 1

An elastomeric sealer was prepared in accordance with the present invention. In an industrial grade Hobart mixer equipped with a 40 quart mixing bowl, 20.31 pounds of oil-based paint waste residue (prepared in accordance with the present invention) was added along with 1.32 pounds of Santicizer 160 plasticizer, 1.84 pounds of Tergitol-XD surfactant, and 0.58 pounds of T-Det N-20 surfactant. The components were mixed together for 15 minutes. While still mixing, 12.5 pounds of water was added in 4 increments over an 8 minute period followed by the addition of 16.8 pounds of water-based latex paint with mixing for 2 minutes. The components were then transferred to a mixing vessel, and 34.3 pounds of virgin latex polymer (UCAR 123 polymer) was added and stirred with a propeller mixer for 10 minutes. The finished sealer was then screened through a 20-mesh screen and packaged for use.

Example 2

A surface primer was prepared in accordance with the present invention. In an industrial grade Hobart mixer equipped with a 40 quart mixing bowl, 20.31 pounds of treated oil-based paint waste residue was added along with 1.32 pounds of Santicizer 160 plasticizer, 1.84 pounds of Tergitol-XD surfactant, and 0.58 pounds of T-Det N-20 surfactant. The components were mixed together for 15 minutes. While still mixing, 12.5 pounds of water was added in 4 increments over an 8 minute period followed by the addition of 16.8 pounds of water-based latex paint and mixed for another 2 minutes. The components were then transferred to another mixing vessel and 34.3 pounds of treated water-based latex paint was added and stirred with a propeller mixer for 10 minutes. The finished primer was then screened through a 20-mesh screen and packaged for use.

Example 3

An elastomeric caulk was prepared in accordance with the present invention. In an industrial grade Hobart mixer equipped with a 40 quart mixing bowl, 20.31 pounds of treated oil-based paint residue was added along with 0.75 pounds of Santicizer 160 plasticizer, 1.05 pounds of Tergitol-XD surfactant, and 0.33 pounds of T-Det N-20 surfactant. The components were mixed together for 15 minutes. While still mixing, 10.61 pounds of water was added in 4 increments over an 8 minute period followed by the addition of 9.6 pounds of water-based latex paint and mixed for another 2 minutes. The components were then transferred to another mixing vessel and 18.0 pounds of UCAR 123 polymer was added and stirred with a propeller mixer for 10 minutes. In addition, 0.86 pounds of Min-U-Gel PC (thixotropic clay) was added and stirred with a propeller mixer for 10 minutes. The finished caulk was then screened through a 20-mesh screen and packaged for use.

Example 4

A bedding cement was prepared in accordance with the present invention in a 5 gallon pail using a propeller mixer for material dispersion. 17.5 pounds of water-based latex paint and 35 pounds of sand were added to the pail and mixed together until the components became homogeneous.

Example 5

A non-slump bedding cement was prepared in accordance with the present invention in a 5 gallon pail using a propeller mixer for material dispersion. 15 pounds of water-based latex paint, 38 pounds of sand, and about 3 pounds of Santicizer 160 plasticizer were added to the pail and mixed together until the components became homogeneous.

Having described the invention in detail and by reference to preferred embodiments thereof, it will be apparent that modifications and variations are possible without departing from the scope of the invention.

What is claimed is:

1. A method of forming a composite roofing overlay comprising:
   providing a roofing surface;
   applying a bedding cement to said roofing surface; said bedding cement comprising water-based paint waste and sand;
   embedding a porous fabric in said bedding cement; and
   applying a primer over said porous fabric and bedding cement.

2. A method of forming a composite roofing overlay comprising:
   providing a roofing surface;
   applying a bedding cement to said roofing surface; said bedding cement comprising water-based paint waste and sand;
   embedding a porous fabric in said bedding cement;
   applying a primer over said porous fabric and bedding cement; said primer comprising an emulsified paint waste residue formed from oil-based paint waste which has been treated to remove at least a portion of the solvents contained therein, water-based paint waste, at least one emulsifier, and a plasticizer; and applying an elastomeric sealer.

3. A method of forming a composite roofing overlay comprising:

providing a roofing surface;

applying a bedding cement to said roofing surface; said bedding cement comprising water-based paint waste and sand;

embedding a porous fabric in said bedding cement;

applying a primer over said porous fabric and bedding cement; said primer comprising an emulsified paint waste residue formed from oil-based paint waste which has been treated to remove at least a portion of the solvents contained therein, water-based paint waste, at least one emulsifier, and a plasticizer; and applying an elastomeric sealer; said elastomeric sealer comprising an emulsified paint waste residue formed from oil-based paint waste which has been treated to remove at least a portion of the solvents contained therein, water-based paint waste, at least one emulsifier; a virgin latex polymer, and a plasticizer.

4. The method of claim 3 including applying an elastomeric caulk over at least a portion of said roofing surface; said caulk comprising an emulsified paint waste residue formed from oil-based paint waste which has been treated to remove at least a portion of the solvents contained therein, water-based paint waste, a virgin latex polymer, at least one emulsifier, a plasticizer, and a thixotropic clay.

5. The method of claim 3 wherein said porous fabric comprises a polyester cloth.

* * * * *